(No Model.)
G. RESSLER.
PIPE THREADER AND REAMER.
No. 536,297. Patented Mar. 26, 1895.
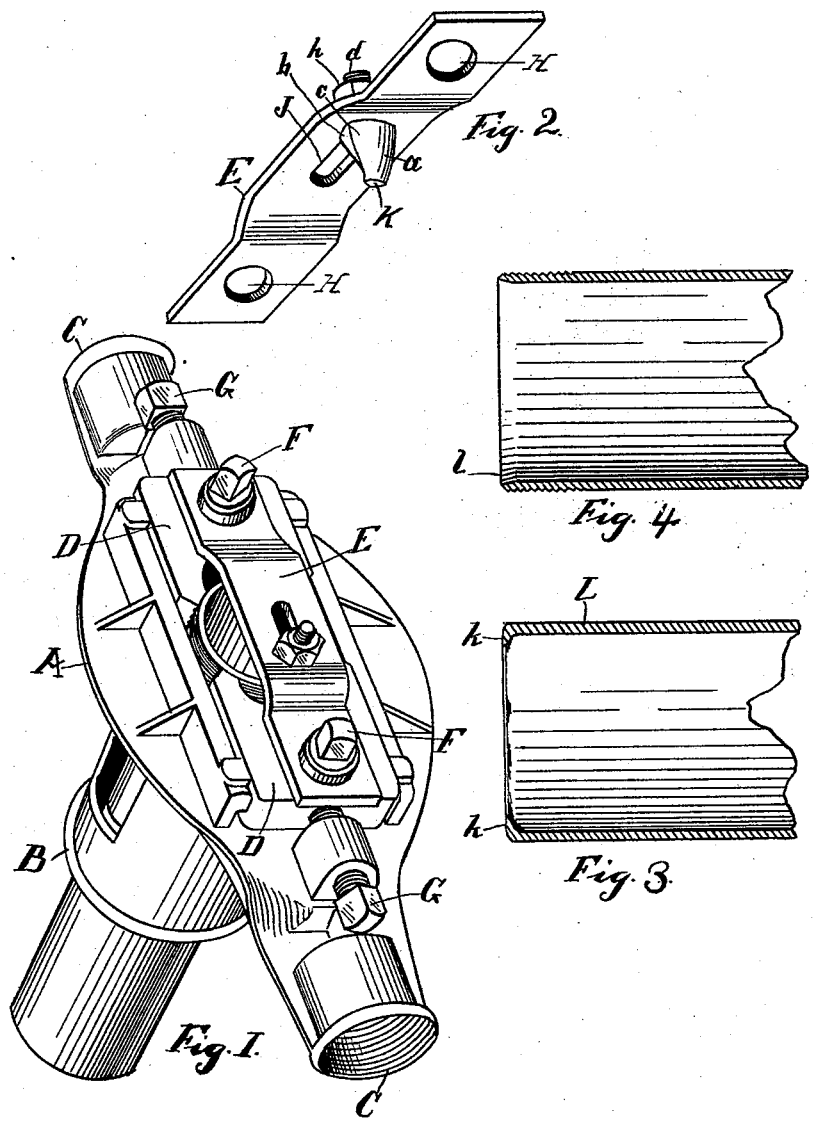
WITNESSES
INVENTOR
George Ressler
By W. K. Miller
Attorney

UNITED STATES PATENT OFFICE.

GEORGE RESSLER, OF CANTON, OHIO.

PIPE THREADER AND REAMER.

SPECIFICATION forming part of Letters Patent No. 536,297, dated March 26, 1895.

Application filed April 16, 1894. Serial No. 507,647. (No model.)

*To all whom it may concern:*

Be it known that I, GEORGE RESSLER, a citizen of the United States, and a resident of Canton, county of Stark, State of Ohio, have invented a new and useful Improvement in Pipe Threaders and Reamers, of which the following is a full, clear, and exact description, reference being had to the accompanying drawings, making part of this specification.

My invention relates to an improvement in pipe threaders and reamers, the object of which is to remove the inwardly projected flange produced by the disk pipe cutter, which is the most commonly used.

With this object in view, my invention relates to certain features of construction and combination of parts as will be hereinafter described and pointed out in the claims.

Figure 1, of the accompanying drawings is a view in perspective of a pipe threader and reamer, illustrating my invention. Fig. 2, is a similar view of the cutter and supporting bar. Fig. 3, is a section of the end portion of a pipe showing the inturned edge or flange. Fig. 4, is a similar view showing the flange or inturned edge removed.

A represents a pipe threader, having a guiding sleeve B, handle sockets C and dies D.

To secure the cutter support E to threader A, perforations are made through the dies D, and corresponding threaded perforations are made in the body of the die holder, into which the bolts F are turned, to secure the bar or cutter support E to the threader as shown in Fig. 1, and to provide for the adjustment of the dies D, by the set screws G, the perforations in the die are made larger than the body of the bolt F.

The bar or cutter support is of the form shown and is provided at its end portions with perforations H, that correspond or register with the perforations made in the body of the threader, to receive the securing bolts F, and at its middle portion with an elongated perforation J, in which is secured the cutter K, which is formed substantially as shown, having a body portion *a*, a cutting edge *b*, a shoulder *c*, a threaded stem *d*, that is passed into and through the perforation J, and secured by the nut *h*. The cutter may be adjusted and secured in desired adjustment by the nut *h*, to ream out more or less of the inner edge of the pipe.

In operation, the end section of pipe L, shown in Fig. 3, cut with the ordinary disk cutter, the cutter has formed and turned in a ragged edged flange portion *k*. To remove this flange, is the object of this invention, which is accomplished as follows: The threader is turned onto the end of the pipe to cut the thread as shown, at which point the cutter K engages and cuts away the flange *k*, leaving the end of the pipe free from such obstruction, and if required, the end may be further reamed out as shown at *l*, Fig. 4.

Having thus fully described the nature and object of my invention, what I claim is—

1. In combination, a pipe threader comprising the dies D, a support E extending across the dies and provided with a longitudinal slot, bolts for securing the support to the head, and a cutter adjustably secured in the said slot, substantially as herein described.

2. A device adapted to be secured to a pipe threader and to simultaneously remove the inner burr or flange with the threading of the pipe, said device consisting of a bar or support having near each end an aperture and in its intermediate portion an elongated slot, a cutter having a screw-threaded shank extending through said slot, and a nut on said shank to clamp the cutter in adjustment, substantially as herein described.

In testimony whereof I have hereunto set my hand this 21st day of March, A. D. 1894.

GEORGE RESSLER.

Witnesses:
BURT A. MILLER,
W. K. MILLER.